(12) United States Patent
Malli Raghavan et al.

(10) Patent No.: US 11,548,401 B1
(45) Date of Patent: Jan. 10, 2023

(54) AUTOMATICALLY IDENTIFYING AN INTENDED ELECTRIC VEHICLE SUPPLY EQUIPMENT

(71) Applicant: ChargePoint, Inc., Campbell, CA (US)

(72) Inventors: Karthick Kumar Malli Raghavan, San Jose, CA (US); Alexander Xerxes Botkin, Santa Clara, CA (US); David Baxter, Campbell, CA (US); Divyashree Tumkur Nataraj, Mountain View, CA (US)

(73) Assignee: CHARGEPOINT, INC., Campbell, CA (US)

( * ) Notice: Subject to any disclaimer, the term of this patent is extended or adjusted under 35 U.S.C. 154(b) by 0 days.

(21) Appl. No.: 17/808,499

(22) Filed: Jun. 23, 2022

(51) Int. Cl.
*B60L 53/65* (2019.01)
*B60L 53/30* (2019.01)

(52) U.S. Cl.
CPC ............. *B60L 53/305* (2019.02); *B60L 53/65* (2019.02)

(58) Field of Classification Search
CPC ........ B60L 53/305; B60L 53/65; B60L 53/60; B60L 53/66; B60L 53/67
See application file for complete search history.

(56) References Cited

U.S. PATENT DOCUMENTS

| | | | |
|---|---|---|---|
| 9,882,430 B1* | 1/2018 | Leabman | H02J 50/23 |
| 9,971,353 B2* | 5/2018 | Tripathi | B60L 53/38 |
| 10,717,412 B2 | 7/2020 | Abel Rayan et al. | |
| 10,791,446 B2* | 9/2020 | Reynders | G06Q 20/308 |
| 2014/0067680 A1 | 3/2014 | Turner | |
| 2019/0184841 A1* | 6/2019 | Van Wiemeersch | B60L 53/38 |
| 2019/0322188 A1 | 10/2019 | Schrader | |
| 2020/0070777 A1 | 3/2020 | Chen et al. | |
| 2020/0148068 A1* | 5/2020 | Melatti | B60L 53/60 |

FOREIGN PATENT DOCUMENTS

WO 2018081321 A1 5/2018

* cited by examiner

*Primary Examiner* — Richard V Muralidar
(74) *Attorney, Agent, or Firm* — Nicholson De Vos Webster & Elliott LLP

(57) ABSTRACT

Automatically identifying an electric vehicle supply equipment (EVSE) is described. A receiver device receives wireless signals from EVSEs, where each wireless signal includes an identifier that is associated with the one of the EVSEs from which that wireless signal is received. The receiver device records signal strength values of the wireless signals and determines, based on the recorded signal strength values, which of the EVSEs is closest to the receiver device. The receiver device initiates a request for an action at the EVSE determined to be closest to the receiver device.

20 Claims, 7 Drawing Sheets

AUTOMATICALLY IDENTIFYING AN INTENDED ELECTRIC VEHICLE SUPPLY EQUIPMENT

FIELD

Embodiments of the invention relate to the field of electric vehicle charging; and more specifically, to automatically identifying an intended electric vehicle supply equipment.

BACKGROUND

Public charging stations for electric vehicles (sometimes referred to as electric vehicle supply equipment (EVSE)) include one or more charging ports that may be locked when not in use. Conventionally, a user may unlock the charging port in a few ways. For instance, some charging stations are designed to read an NFC/RFID tag of a user (e.g., the user waives the NFC/RFID tag to the station), perform an authorization process to determine whether charging is authorized, and unlock the charging port if authorized. As another example, some charging stations include an identifier (e.g., a QR code or other barcode) that a user can read with a smartphone and transmit to a server for authorization (e.g., based on the user identifier and possibly the station identifier) and if authorized, the charging port is unlocked. As another example, a user can use an application (e.g., a smartphone app) to find and name match the station they are parked at from a group of similarly looking and named stations and press a button to initiate the authorization and unlocking process.

SUMMARY

An aspect includes a method for automatically identifying an electric vehicle supply equipment (EVSE). The method includes receiving, at a receiver device, multiple wireless signals from multiple EVSEs respectively, where each of the wireless signals includes an identifier that is associated with the one of the EVSEs from which that wireless signal is received; recording signal strength values of the wireless signals; determining, based on the recorded signal strength values of the wireless signals, which of the EVSEs is closest to the receiver device; and initiating a request for an action at the EVSE determined to be closest to the receiver device. Other embodiments of this aspect include corresponding computer systems, apparatus, and computer programs recorded on one or more computer storage devices, each configured to perform the actions of the methods.

The received wireless signals may be Bluetooth Low Energy (BLE) beacon signals. The receiver device may be included within the electric vehicle and the determination of which of the EVSEs is closest to the receiver device is performed by an application executing within the electric vehicle. The determination of which EVSE is closest may be done responsive to detecting that a door of the electric vehicle has been opened or the electric vehicle has been put into park. The receiver device may be a smartphone and determining which of the EVSEs is closest may be done responsive to detecting that the smartphone has transitioned from driving mode to non-driving mode. Initiating the request for the action at the determined EVSE includes transmitting an EVSE identifier that is associated with the EVSE that is determined to be closest to the receiver device to a server to perform an authorization procedure. Initiating the request for an action at the determined EVSE includes transmitting an identifier associated with an operator of the electric vehicle or an identifier associated with the electric vehicle to the server. Implementations of the described techniques may include hardware, a method or process, or computer software on a computer-accessible medium.

An aspect includes a method that includes broadcasting, from multiple electric vehicle supply equipments (EVSEs), multiple wireless signals, where each wireless signal from one of the EVSEs includes an identifier that is uniquely associated with that one of the EVSEs, the wireless signals being capable of being used by an application of a receiver device as a basis to automatically identify which of the EVSEs is closest to the receiver device; receiving, at one of EVSEs, a communication from a server that indicates to enable charging; unlocking a charging port at that one of the EVSEs responsive to the received communication. The method also includes enabling charging service through the unlocked charging port. Other embodiments of this aspect include corresponding computer systems, apparatus, and computer programs recorded on one or more computer storage devices, each configured to perform the actions of the methods. The broadcast wireless signals may be Bluetooth Low Energy (BLE) beacon signals. The method may further include showing a visual indicator on the one of the EVSEs that signifies that the one EVSEs has been automatically identified. Prior to broadcasting the wireless signals, each of the EVSEs may determine that it is available for charging an electric vehicle. Determining that the EVSE is available for charging an electric vehicle may include determining that the EVSE is not currently charging an electric vehicle. Implementations of the described techniques may include hardware, a method or process, or computer software on a computer-accessible medium.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
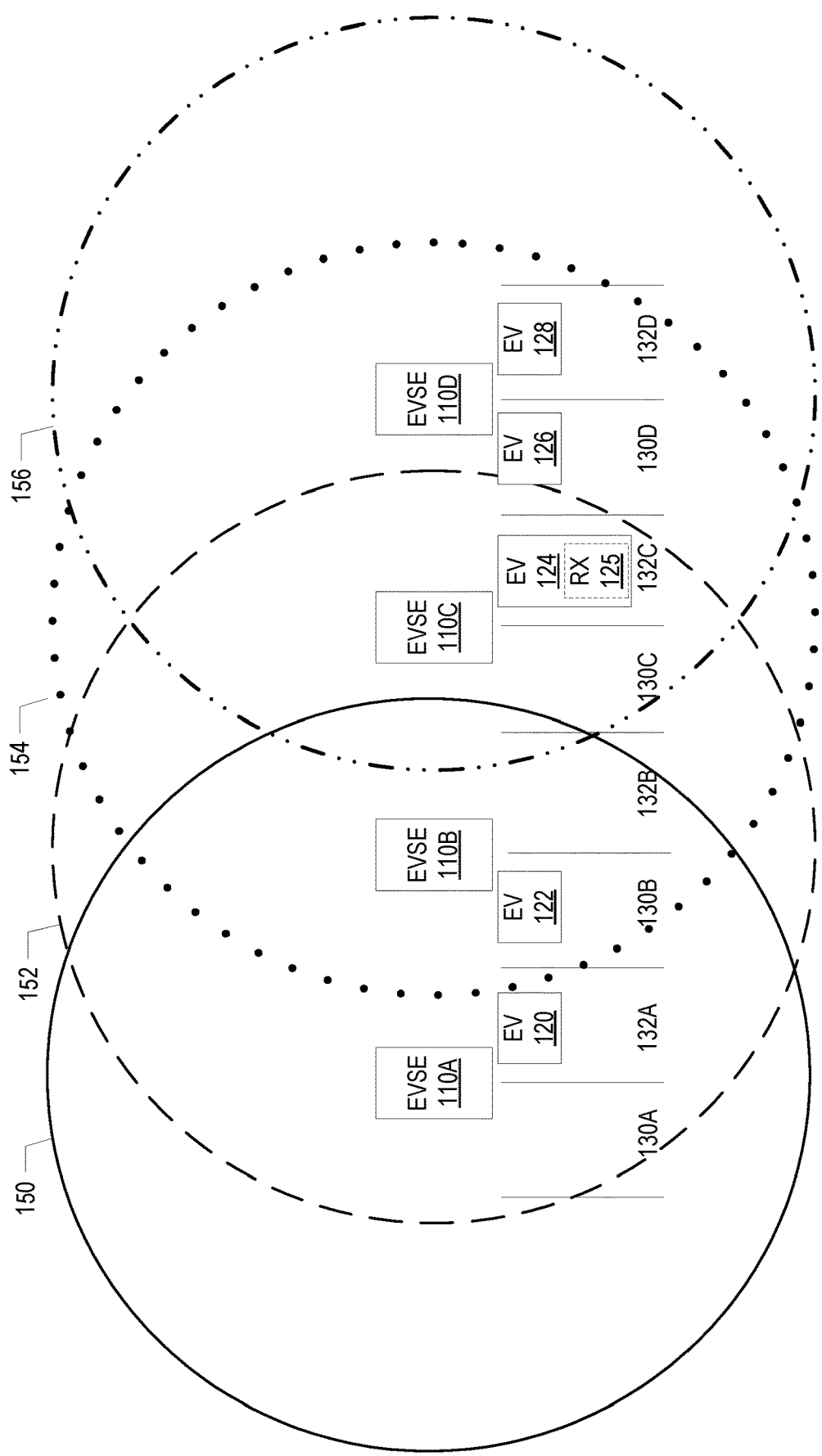
FIG. 1 illustrates an exemplary environment for automatically identifying an intended EVSE for charging an electric vehicle according to an embodiment.

Automatically identifying an intended electric vehicle supply equipment (EVSE) for charging an electric vehicle is described. In an embodiment, EVSEs continuously broadcast a wireless signal such as a Bluetooth Low Energy (BLE) beacon signal. The wireless signals from a particular EVSE include an identifier that is uniquely associated with that particular EVSE. A receiver device (e.g., a mobile computing device of a vehicle operator, an electric vehicle) receives these wireless signals from all EVSEs that are within range and automatically determines which EVSE is closest to the receiver device based on signal strength of the wireless signals. After determining which EVSE is closest to the receiver device, the receiver device automatically initiates a request for an action on the identified EVSE. The action may include unlocking a charging port on the identified EVSE and/or authorizing an operator and/or vehicle for charging service at a charging port on the identified EVSE.

For example, in an embodiment, the receiver device automatically initiates an unlocking procedure at the EVSE determined to be closest to the receiver device and/or initiates a charging service authorization procedure for charging an electric vehicle at the EVSE determined to be closest to the receiver device. The receiver device may transmit an identifier of the EVSE and optionally an identifier of the electric vehicle or operator to a charging service server for determining whether to grant the request.

For example, the request may initiate a charging service authorization procedure (which may also include unlocking a charging port if locked). The receiver device may transmit an identifier of the determined EVSE and an identifier of the EV or operator to the server which in turn determines whether charging service is authorized at that determined EVSE. If the charging service is authorized, the charging service server transmits a communication for that EVSE to enable the charging session, which may include unlocking a charging port at the EVSE.

As another example, the request may initiate a charging port unlocking procedure without a charging service authorization procedure. For instance, the EVSE may have locked charging port(s) but operates in a mode that does not require authorization (e.g., it can be used by anyone without payment) or authorization is provided through a separate mechanism (e.g., after plugging the vehicle in and authorizing through plug and charge). The receiver device may transmit an identifier of the determined EVSE and optionally an identifier of the EV or operator to the server. The server determines whether to grant the request. In some cases, the server may determine whether the EV or operator is authorized to unlock the charging port; in other cases all EVs and operators can be authorized to unlock the charging port. If determined to unlock the charging port, the server transmits a communication to the determined EVSE to unlock a charging port.

Some embodiments described herein allow for an electric vehicle operator to park their vehicle near an EVSE, get out of their vehicle, and plugin their vehicle for charging without the operator being required to open a charging application on their phone, waiving an RFID tag, or scanning a QR code.

FIG. 1 illustrates an exemplary environment for automatically identifying an intended EVSE for charging an electric vehicle according to an embodiment. FIG. 1 shows four EVSEs: EVSE 110A-EVSE 110D and parking spaces 130A-D and 132A-D. The number of EVSEs shown in FIG. 1 is exemplary as embodiments can be used in environments with more or fewer EVSEs. Further, the number of parking spaces shown in FIG. 1 is exemplary and embodiments can be used in environments with more or fewer EVSEs. For instance, in some cases, there may be a single parking space for each EVSE.

FIG. 1 shows an example of several electric vehicles parked in parking spaces adjacent to the EVSE 110A-EVSE 110D. The EV 120 is parked in the parking space 132A adjacent to the EVSE 110A, the EV 122 is parked in the parking space 130B adjacent to the EVSE 110B, the EV 124 is parked in the parking space 132C adjacent to the EVSE 110C, the EV 126 is parked in the parking space 130D adjacent to the EVSE 110D, and the EV 128 is parked in the parking space 132D adjacent to the EVSE 110D.

In an embodiment, the EVSEs 110A-D are dual charging port stations such that they can each connect with two electric vehicles. For instance, if a dual charging port station, the EVSE 110A can connect to an EV parked in the parking space 130A and connect to an EV parked in the parking space 132A. In another embodiment, the EVSES 110A-D are single charging port stations such that they can connect with a single electric vehicle at a time. As an example, in such a case, the EVSE 110A can connect to an EV parked in either of the parking spaces 130A and 130B.

Each EVSE 110 periodically and continuously broadcasts a wireless signal such as a BLE beacon signal when charging is available at the EVSE 110. For purposes of explanation this signal is referred herein as a beacon signal, such as a BLE beacon signal, however the signal may not be a beacon signal and can be any short-range communication signal. Each beacon signal includes an identifier (e.g., a universally unique identifier) that is uniquely associated with an EVSE. The identifier included in a beacon signal is sometimes referred herein as a beacon identifier. A beacon identifier may be mapped one-to-one with an EVSE identifier. For instance, beacon signals transmitted by the EVSE 110A include a beacon identifier that is uniquely associated with the EVSE 110A, beacon signals transmitted by the EVSE 110B include a beacon identifier that is uniquely associated with the EVSE 110B, and so on. The mapping between a beacon identifier and an EVSE identifier may be stored in a server that a receiver device can access. In an embodiment, the beacon identifier and the EVSE identifier may be the same identifier. In an embodiment, the beacon signal may also include an organization identifier that identifies an organization that controls the EVSE (e.g., an owner of the EVSE).

The beacon signal ranges may overlap between EVSEs. An illustrative beacon signal range for each EVSE 110 is illustrated in FIG. 1. The range of the beacon signals broadcast by the EVSE 110A is represented by the solid line circle 150, the range of the beacon signals broadcast by the EVSE 110B is represented by the dashed line circle 152, the range of the beacon signals broadcast by the EVSE 110C is represented by the dotted line circle 154, and the range of the beacon signals broadcast by the EVSE 110D is represented by the dashed-dotted line circle 156.

In an embodiment, an EVSE 110 is configured to transmit a beacon signal only when the EVSE is available for charging. For example, in such an embodiment, if the EVSE 110 does not have any available charging port(s) (e.g., the charging port(s) are all in use), the EVSE 110 does not transmit a beacon signal. As another example, if the EVSE 110 is in an error condition that prevents it from charging, it does not transmit these beacon signals. As another example, if the charging port(s) of the EVSE 110 are reserved or a reservation is upcoming (defined by a threshold amount of time away from the current time), the EVSE does not transmit these beacon signals. In the example shown in FIG. 1, the EVs 126 and 128 are plugged into the EVSE 110D. Accordingly, in such an example, the EVSE 110D may not broadcast the beacon signals.

In an embodiment, the beacon signal may have different payloads for different states and/or parameters. For example, the beacon signals from a particular station may each have the same identifier (e.g., an organization identifier and an EVSE identifier) but have different payload values for different states and/or parameters such as port locked, user authorized, cable connected, charging started, charging reserved, port type, and speed of charging (e.g., DC fast station compared to a slower AC station). The payload may include an organization identifier. As another example, if an EVSE has restricted access (e.g., available only for disabled persons, time restricted charging, available only for a closed community such as an apartment complex or office complex), that EVSE can be configured to emit beacon signals with differentiating payloads to represent such restricted access.

Electronic devices that include wireless receivers can receive the beacon signals from the EVSEs 110-110D when in range. For example, a smartphone may be capable of receiving such a beacon signal. As another example, an electric vehicle itself be capable of receiving such a beacon signal. The electronic devices that receive these beacon signals are sometimes referred herein as receiver devices. The receiver devices may include monitoring and ranging capability. The monitoring capability helps the receiver devices observe the beacon signals using enter and exit information, which is typically set to the emit radius of the beacons. For example, if the emit radius of these beacons are set to emit up to 10 meters at certain intervals, the receiver device will receive these beacon signals when they are within 10 meters of the EVSE and receive the information about the region enter from all the nearby EVSEs when that device is within range.

The receiver devices can record signal strength (e.g., relative signal strength indicators (RSSI)) from each beacon signal received from the EVSEs 110A-110D from the time the receiver device starts receiving the region enter information. The signal strength values are continuously received (e.g., every ten or hundreds of milliseconds depending on configuration). The signal strength values naturally show the highest value to the receiver that then represents the beacon transmitter that is closest to the receiver.

In an embodiment, the receiver device can record the signal strength values for beacon signals received from those EVSEs 110A-110D from which they received a region enter alert for a configurable amount of time. For example, the amount of time may be 2 to 3 seconds for an application running on an electric vehicle; and 4-5 seconds for an application running on a smartphone. The application running on the receiver device may stop listening for the signal strength values from the beacon signals from a particular EVSE and stop recording the values when the signal strength value is above a predefined confidence threshold and does not fluctuate for a predefined amount of time.

In an embodiment, the receiver device may be configured to receive and/or process beacon signals only when a certain condition exists. For example, in case the receiver device is an application running on an electric vehicle, the receiver device may not receive and/or process these beacon signals until it receives a signal that the door is opened and/or the vehicle has been placed into park. In the case the receiver device is a mobile device such as a smartphone, the application on the receiver device may only receive and/or process beacon signals if the mobile device detects that it has transitioned from driving mode (and optimally in driving mode for at least a predefined amount of time such as the last 1-2 minutes) to non-driving mode (e.g., walk mode).

In an embodiment, if an operator is in a waitlist for a group of EVSEs that transmit beacon signals, when an EVSE becomes available and reserved for the operator, the beacon signal from that EVSE can have a specific payload that indicates "charging reserved". A receiver device or app on a waitlist can filter only the signals from the EVSE with this specific payload "charging reserved" to help identify the target EVSE.

In an embodiment, the application on the receiver device may be configured to receive and/or process beacon signals based on port type, speed of charging (e.g., DC fast station over a slower AC station), organization, or other charging preferences. For example, if the EV only accepts a certain type of charging cable, the application on the receiver device may be configured to process beacon signals from EVSEs that have or accept that type of charging cable. As another example, if the application on the receiver device has information that specifies that the operator and/or vehicle does not have access to EVSEs of the organization identified in the beacon signal, the application may not process that beacon signal further.

The application running on the receiver device processes these beacon signals and determines, based on the recorded signal strength of these beacon signals, which of the EVSEs is closest to the receiver device. The EVSE that is closest to the receiver device is the EVSE that is likely to be one that is intended to be used for charging the EV. A machine learning algorithm may be used to determine which of the EVSEs is closest to the receiver device. The machine learning algorithm may be, for example, a K-Nearest Neighbor (KNN) algorithm or polygon triangulation algorithm. Alternatively, the EVSE that is closest to the receiver device may be determined by the beacon signals with the strongest signal strength (e.g., for each beacon identifier, summing the values of the recorded signal strength of the beacon signals and choosing the beacon identifier with the largest value; or averaging the values of the recorded signal strength of the beacon signals and choosing the beacon identifier with the highest average). The application on the receiver device may lookup the EVSE identifier uniquely associated with the beacon identifier that is determined to be closest to the receiver device.

In the example shown in FIG. 1, the electric vehicle 124 is parked in the parking space 132C adjacent to the EVSE 110C. A receiver device 125 associated with the EV 124 (e.g., the EV 124 itself or a smartphone of an operator or passenger of the EV 124) receives beacon signals from the EVSEs that are in range. In the example of FIG. 1, the receiver device 125 associated with the EV 124 is within range of beacon signals transmitted by the EVSE 110B, beacon signals transmitted by the EVSE 110C, and beacon signals transmitted by the EVSE 110D. As described elsewhere, in an embodiment, the EVSE 110D shown in the example of FIG. 1 does not transmit beacon signals because it is not available for charging. Since the receiver device 125 is closer in proximity to the EVSE 110C, the recorded signal strength of the beacon signals should be highest for those beacon signals received from the EVSE 110C compared to being received from the EVSE 110B or EVSE 110D. Using the signal strength information, the application running on the receiver device 125 determines the beacon that is closest to the receiver device 125 and therefore which EVSE is closest to the receiver device 125. The application running on the receiver device 125 may lookup the EVSE identifier based on the beacon identifier of the beacon determined to be closest to the receiver device 125. The EVSE that is closest to the receiver device is the EVSE that is likely to be one that is intended to be used for charging the EV. In the example of FIG. 1, the application running on the receiver device 125 determines that the EVSE 110C is closest to the receiver device 125 and therefore is the EVSE that is likely to be used for charging the EV 124.

After determining the EVSE that is likely to be used for charging the EV 124, which is the EVSE 110C in the example of FIG. 1, the receiver device 125 automatically initiates a request for an action on the EVSE 110C. The action may include unlocking a charging port on the EVSE 110C and/or authorizing an operator and/or vehicle for charging service at a charging port on the EVSE 110C. The authorization process may determine whether to unlock a charging port on the EVSE 110C and/or whether charging the EV 124 is allowed at the EVSE 110C. The authorization requirements may be different depending on the configuration of the EVSE 110C. For example, if the EVSE 110C operates in a mode that is available to all EV operators, authorization may include ensuring that payment for the charging service is properly authorized (e.g., using a valid credit card, valid pre-paid account with sufficient credits, valid subscription, etc.). As another example, if the EVSE 110C operates in a restricted mode, authorization may include determining whether the electric vehicle operator and/or the electric vehicle 124 is allowed to use the EVSE at that time and may also include ensuring that payment for the charging service is properly authorized. For instance, an identifier (or a portion of an identifier) associated with the electric vehicle operator (e.g., a username/password, an email address, a phone number, an address, a credit card number, account number, PIN (personal identification number), or any other identifying information associated with the electric vehicle operator) or the electric vehicle (e.g., a VIN (vehicle identification number), vehicle account number), which is hereinafter referred to as an "access identifier," may be checked against a list of identifiers authorized for access (e.g., an allow list of identifiers) and/or against a list of identifiers not authorized for access (e.g., a deny list of identifiers). In addition, payment authorization may include determining whether a credit card is valid, whether a pre-paid account associated with the identifier has sufficient credits for the charging service, whether a subscription account associated with the identifier is in good standing, etc. In some cases, authorization is not required for charging or for unlocking a charging port (e.g., the EVSE 110C operates in an open or free mode that is available to all EV operators without cost).

In an embodiment, the receiver device 125 automatically transmits an identifier associated with EVSE 110C (e.g., the beacon identifier or the EVSE identifier) to a server. The receiver device 125 may also transmit an access identifier, charging preferences, and/or charging parameters to the server. In another embodiment, the receiver device 125 transmits an access identifier, charging preferences, and/or charging parameters to the EVSE 110C which may then transmit the same to the server. If the EVSE 110C requires authorization for charging, the server may perform an authorization process with the received information.

In a case where authorization is required for unlocking a charging port and/or enabling charging service and proper authorization has been determined, the server transmits a message to the EVSE 110C to take a charging service related action such as unlocking the charging port (if locked) to allow the operator to access the charging port and/or the charging cable and/or energizing the charging cable (e.g., after being connected to the EV) and provide charging service to the EV. The server may also transmit charging parameters to the EVSE 110C or other information relevant to the charging session.

In an embodiment, the identified EVSE (EVSE 110C) may, in response to receiving the message from the server, show a visual indicator and/or play an audio indicator that signifies the EVSE 110C is the EVSE that has been identified. This visual and/or audio indicator allows the vehicle operator to determine whether the automatically identified EVSE is the EVSE that the vehicle operator wants to use. The visual indicator may be a light (such as an LED) that illuminates for a period after being automatically identified. The visual indicator may be a light on a charging port and/or charging cable (e.g., on the charging connector) that illuminates for a period after being automatically identified. The visual indicator may be on a display of the EVSE 110C. The audio indicator may be a chime, beep, or other audio signal.

Figure 2:
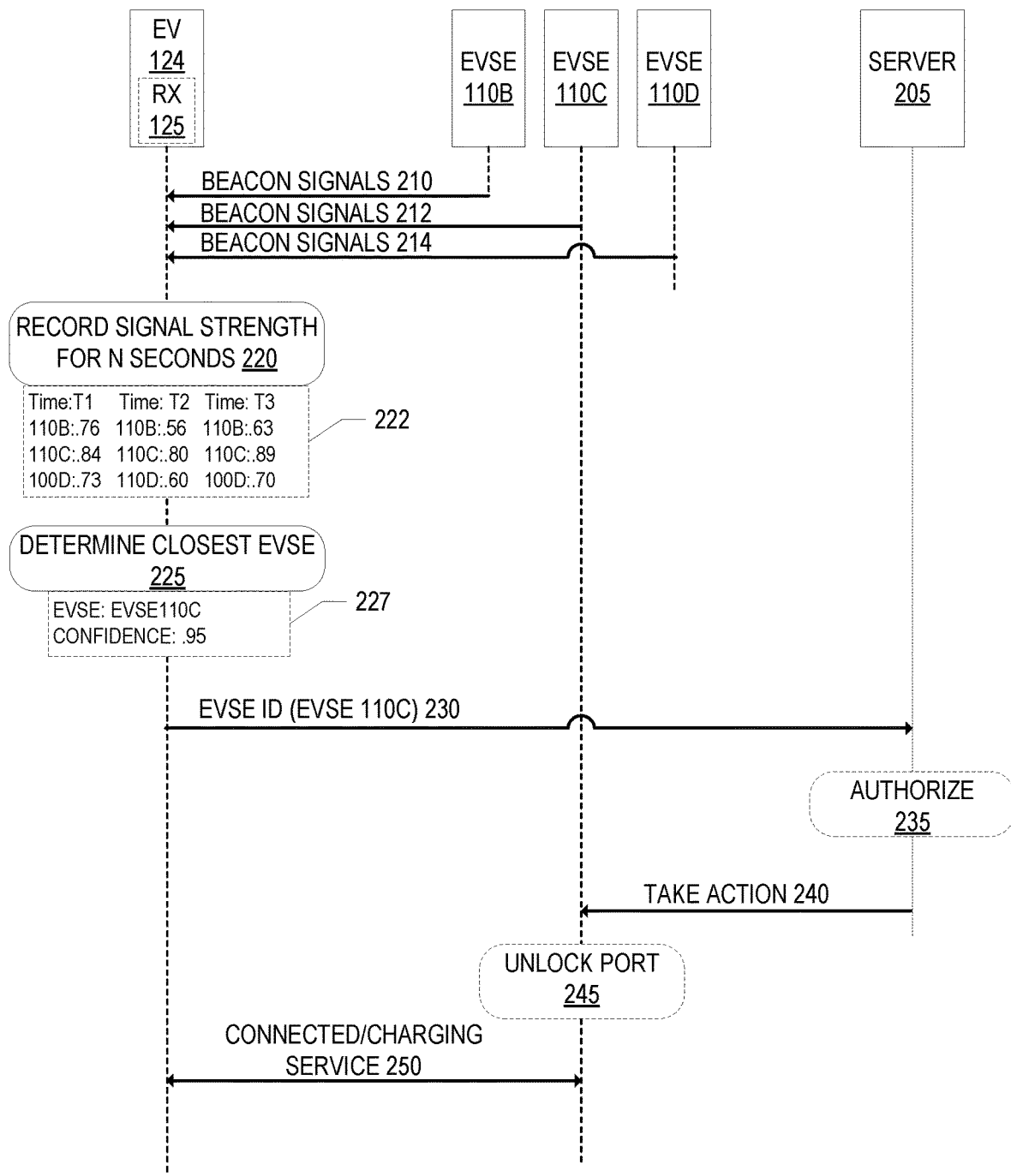
FIG. 2 is a sequence diagram that illustrates exemplary operations for automatically identifying an intended EVSE according to an embodiment.

FIG. 2 is a sequence diagram that illustrates exemplary operations for automatically identifying an intended EVSE according to an embodiment. The operations of FIG. 2 are described with reference to the exemplary embodiment of FIG. 1. The EV 124 is parked in the parking space 132C as shown in FIG. 1. The receiver device 125 receives beacon signals from the EVSE 110B at operation 210, receives beacon signals from the EVSE 110C at operation 212, and receives beacon signals from the EVSE 110D at operation 214. The receiver device 125 records the signal strength of these beacon signals for N seconds at operation 220. Exemplary signal strength values 222 are shown for the beacon signals. At operation 225, the receiver device 125 determines the closest EVSE based on the recorded signal strength values. As shown in FIG. 2, the signal strength values of beacon signals received from the EVSE 110C have a higher average than the signal strength values of beacon signals received from the EVSE 110B and EVSE 110D. The receiver device 125 determines, in this example, that the EVSE 110C is the closest EVSE (out of the EVSEs 110B, 110C, and 110D). An exemplary determination structure 227 is shown with a confidence level that the EVSE 110C is the EVSE closest to the receiver device 125. Although the example shown in FIG. 2 is where the EVSE closest to the receiver device 125 is determined over a confidence threshold, if a determination cannot be made over such confidence threshold, then alternative actions are taken (e.g., the operator may need to unlock the charging port in conventional ways).

After determining that the EVSE 110C is closest to the receiver device 125 and therefore is likely the EVSE to be used for charging the EV 124, the receiver device 125 initiates a request for an action at the EVSE 110C. The action may be for unlocking a charging port on the EVSE 110C and/or authorizing an operator and/or vehicle for charging service at a charging port on the EVSE 110C. Initiating the request includes transmitting an identifier associated with the EVSE 110C (e.g., the beacon identifier or the EVSE identifier) to the server 205 at operation 230. The receiver device 125 may also transmit an access identifier, charging preferences, and/or charging parameters to the server. If the EVSE 110C requires authorization for charging, the server performs an authorization process 235 with the received information. If the server determines to grant the request for the action, the server 205 transmits a message to the EVSE 110C to take the action at operation 240. As an example, if the action is to unlock a charging port on the EVSE 110C, the server 205 transmits a message to the EVSE 110C to unlock a charging port on the EVSE 110C. If the EVSE 110C has multiple charging ports, the message to unlock may identify one of the multiple charging ports to be unlocked. Alternatively, the message to unlock may not specify the charging ports and the EVSE 110C can choose which of the ports to unlock or unlock all available ports. As another example, if the action is to enable charging service, the server 205 may transmit a message to the EVSE 110C to enable charging (and to unlock the charging port if locked). The server may also transmit charging parameters to the EVSE 110C or other information relevant to the charging session. The EVSE 110C may unlock the charging port (if locked) at operation 245 to allow the operator to access the charging port and/or the charging cable. Assuming that the charging cable is connected to the EV and any authorization has completed, charging service is provided to the EV at operation 250.

Figure 3:
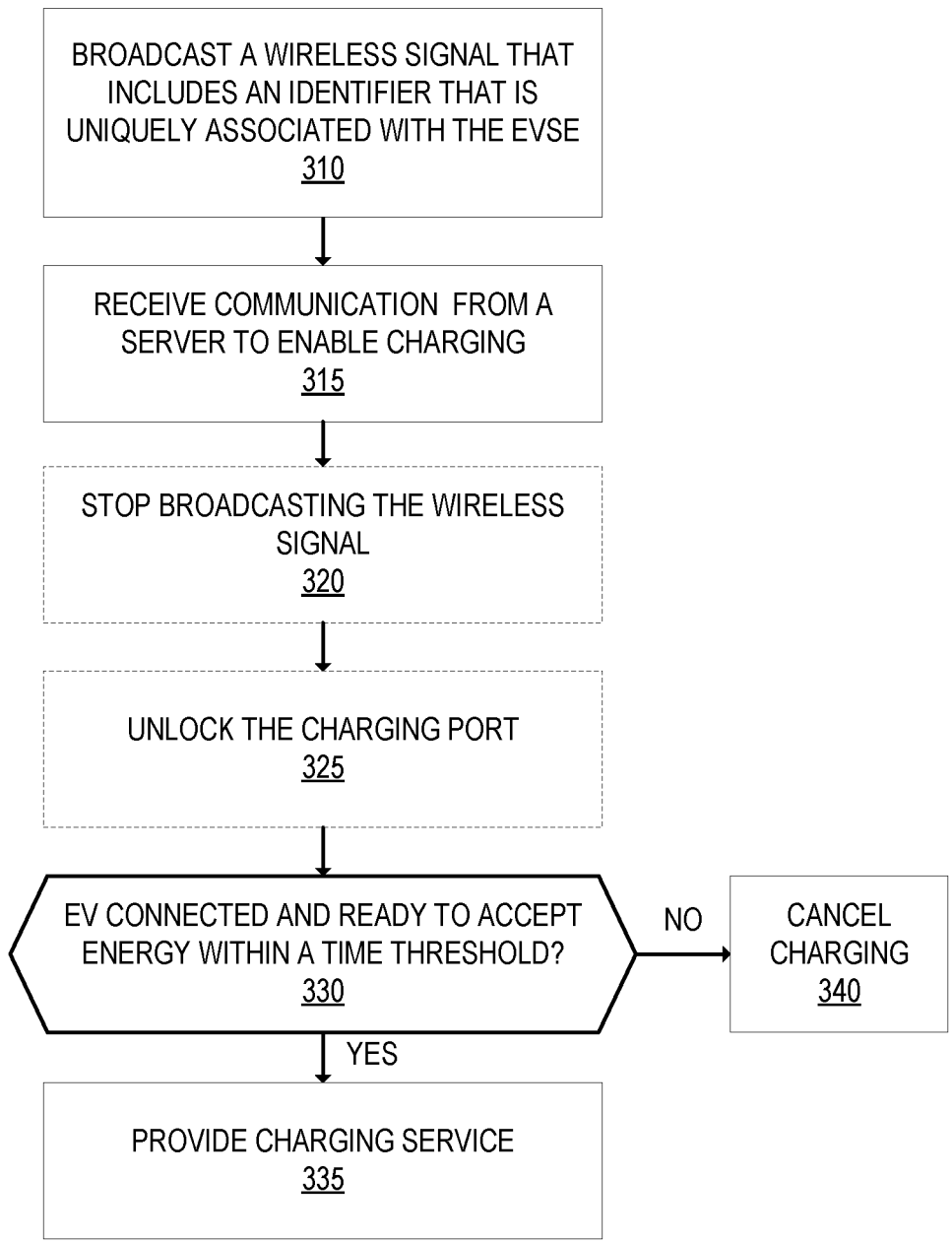
FIG. 3 is a flow diagram that illustrates exemplary operations performed by an EVSE for use in automatically identifying an intended EVSE according to an embodiment.
Figure 4:
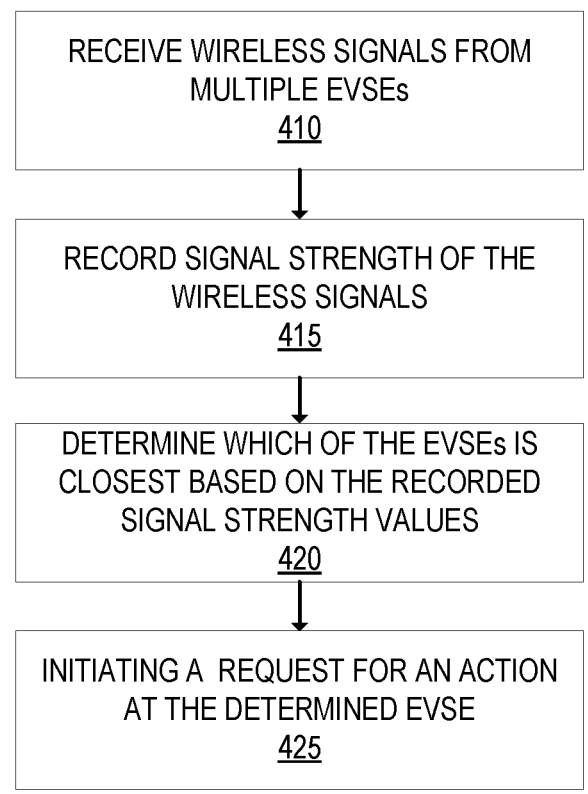
FIG. 4 is a flow diagram that illustrates exemplary operations performed by a receiver device for automatically identifying an intended EVSE according to an embodiment.
Figure 5:
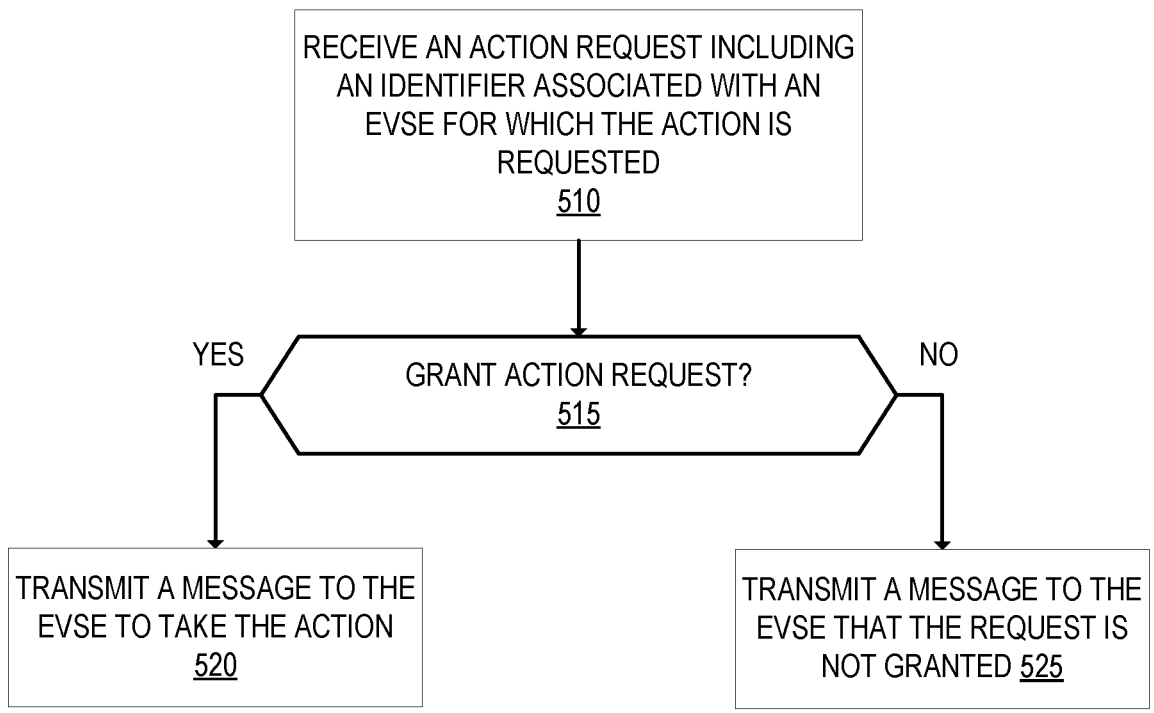
FIG. 5 is a flow diagram that illustrates exemplary operations performed by a server according to an embodiment.

FIG. 3 is a flow diagram that illustrates exemplary operations performed by an EVSE for use in automatically identifying an intended EVSE according to an embodiment. FIG. 4 is a flow diagram that illustrates exemplary operations performed by a receiver device for automatically identifying an intended EVSE according to an embodiment. FIG. 5 is a flow diagram that illustrates exemplary operations performed by a server according to an embodiment. The operations of these flow diagrams are described with respect to each other and with respect to FIGS. 1 and 2. However, the operations of these flow diagrams can be performed by embodiments different from that of FIGS. 1 and 2, and the embodiments shown in FIGS. 1 and 2 can perform operations different from the operations of these flow diagrams.

At operation 310, an EVSE broadcasts a wireless signal that includes an identifier that is uniquely associated with that EVSE. The wireless signal may be a BLE beacon signal. The identifier included within the wireless signal (referred to as a beacon identifier) may be mapped to a unique EVSE identifier. The EVSE may broadcast the wireless signal periodically. The wireless signal can be used by a receiver device for automatically identifying an intended EVSE. The wireless signal may also include an organization identifier and/or have different payloads for different states and/or parameters as described elsewhere herein.

Referring to operation 410 of FIG. 4, a receiver device (e.g., a smartphone, an application running on an EV) receives wireless signals from multiple EVSEs. These wireless signals are like the wireless signal described in operation 310.

Next, at operation 415, the receiver device records signal strength values (e.g., RSSI values) of these wireless signals. In an embodiment, the receiver device records the signal strength values for an amount of time. For example, the amount of time may be 2 to 3 seconds for an application running on an electric vehicle; and 4-5 seconds for an application running on a smartphone. The receiver device may be configured to receive and/or process these wireless signals only when a certain condition exists. For example, in case the receiver device is an application running on an electric vehicle, the receiver device may not receive and/or process these wireless signals until it receives a signal that the door is opened and/or the vehicle has been placed into park. In the case the receiver device is a mobile device such as a smartphone, the application on the receiver device may only receive and/or process these wireless signals if the mobile device detects that it was in driving mode in the last few minutes (a predefined amount of time such as the last 1-2 minutes) and then changed to non-driving mode (e.g., walk mode). In an embodiment, the application on the receiver device may be configured to receive and/or process beacon signals based on port type, speed of charging (e.g., DC fast station over a slower AC station), organization, or other charging preferences. For example, if the EV only accepts a certain type of charging cable, the application on the receiver device may be configured to process beacon signals from EVSEs that have or accept that type of charging cable. As another example, if the application on the receiver device has information that specifies that the operator and/or vehicle does not have access to EVSEs of the organization identified in the beacon signal, the application may not process that beacon signal further. As another example, if the application on the receiver device has information that specifies that the operator and/or vehicle is in a waitlist for a group of EVSEs, the application may process a beacon signal only from an EVSE that has a specific payload that indicates "charging reserved" for the operator and/or vehicle.

Next, at operation 420, the receiver device determines which of the EVSEs is closest based on the recorded signal strength values. The EVSE that is closest to the receiver device is the EVSE that is likely to be one that is intended to be used for charging the EV. A machine learning algorithm may be used to determine which of the EVSEs is closest to the receiver device. The machine learning algorithm may be, for example, a K-Nearest Neighbor (KNN) algorithm or a polygon triangulation algorithm. Alternatively, the EVSE that is closest to the receiver device may be determined by the wireless signals with the strongest signal strength (e.g., for each beacon identifier, summing the values of the recorded signal strength of the wireless signals and choosing the beacon identifier with the largest value; or averaging the values of the recorded signal strength of the beacon signals and choosing the beacon identifier with the highest average). The application on the receiver device may lookup the EVSE identifier uniquely associated with the beacon identifier that is determined to be closest to the receiver device.

At operation 425, the receiver device automatically initiates a request for an action at the determined EVSE. The action may include unlocking a charging port on the determined EVSE and/or authorizing an operator and/or vehicle for charging service at a charging port of the determined EVSE. Automatically initiating a request may include the receiver device transmitting an identifier associated with the determined EVSE (e.g., the beacon identifier or the EVSE identifier) to the server. The receiver device may also transmit an access identifier, charging preferences, and/or charging parameters to the server. In another embodiment, the receiver device transmits an access identifier, charging preferences, and/or charging parameters to the determined EVSE which may then transmit the same to the server.

Although FIG. 4 illustrates an example where the receiver device receives wireless signals from multiple EVSEs, similar operations can be performed if the receiver device receives wireless signals from a single EVSE with an exception that operation 420 does not need to be performed. In such a case, the receiver device may initiate a request for the action to that single EVSE.

Referring to FIG. 5, a server receives a request for an action including an identifier associated with an EVSE for which the action is requested at operation 510. The request may be received from a receiver device and be like the request transmitted in operation 425. The request may include an access identifier, charging preferences, and/or charging parameters.

Next, at operation 515, the server determines whether to grant the request for the action. In a case where the action is to unlock a charging port and authorization is required, the server determines whether the operator and/or EV is allowed to unlock the charging port. determining that payment for the charging service is properly authorized. For instance, an identifier (or a portion of an identifier) associated with the electric vehicle operator (e.g., a username/password, an email address, a phone number, an address, a credit card number, account number, PIN (personal identification number), or any other identifying information associated with the electric vehicle operator) or the electric vehicle (e.g., a VIN (vehicle identification number), vehicle account number), may be checked against a list of identifiers authorized for access (e.g., an allow list of identifiers) and/or against a list of identifiers not authorized for access (e.g., a deny list of identifiers). In a case where the action is to unlock a charging port and authorize charging service, the server determines whether the operator and/or EV is allowed the operator and/or EV is allowed to use the EVSE and/or determining that payment for the charging service is properly authorized in a like way as described above. In addition, payment authorization may include determining whether a credit card is valid, whether a pre-paid account associated with the identifier has sufficient credits for the charging service, whether a subscription account associated with the identifier is in good standing, etc. If the EVSE for which the action is requested does not require authorization for the action (e.g., the EVSE is in a mode that allows any operator to use without cost), the server will determine to grant the request.

If the request is granted, then at operation 520, the server transmits a communication to that EVSE that causes that EVSE to take the action such as unlocking the charging port and/or enabling the charging session. The server may also transmit charging parameters to the EVSE or other information relevant to the charging session. If the request is not granted, then at operation 525, which is optional in an embodiment, the server transmits a message to that EVSE that indicates that the request is not granted. If the request is not granted, the EVSE may display or otherwise indicate to the EV operator that the request was not granted. The determination result may also be displayed on the receiver application.

Referring back to FIG. 3, at operation 315, the EVSE receives communication from the server to take an action such as unlocking the charging port and/or enabling charging. This communication may be like the message transmitted by the server as described in operation 520. In an embodiment, the EVSE may show a visual indicator and/or play an audio indicator that signifies which EVSE has been identified. The visual indicator may be a light (such as an LED) that illuminates for a period after being automatically identified. The visual indicator may be a light on a charging port and/or charging cable (e.g., on the charging connector) that illuminates for a period after being automatically identified. The visual indicator may be on a display of the EVSE. The audio indicator may be a chime, beep, or other audio signal.

Next, at operation 320 which is optional in some embodiments, the EVSE stops broadcasting the wireless signal. At operation 325, the EVSE takes the action of unlocking the charging port to allow the operator to access the charging port and/or the charging cable. If the EVSE does not support locking the charging port, then the operation 325 is not performed.

Next, at operation 330, the EVSE determines whether an EV is connected and ready to accept energy within a time threshold. For instance, if the operator does not plugin their EV within a certain period of time, it may be that the wrong EVSE was identified as the intended EVSE. If an EV is not connected within that period of time, then charging is cancelled at operation 340. Cancelling the charging service may include locking the charging port. If an EV is connected and ready to accept energy within that period of time, then at operation 335 charging service is provided.

While embodiments have described an EVSE identifier that is included in the beacon signal, in another embodiment in lieu of or in addition to the EVSE identifier, a port identifier can be included in the beacon signal that identifies a charging port. This may be used, for example, if there are a bank of charging ports that are geographically distributed (e.g., at each parking space) and connected to a single EVSE. In such an embodiment, a beacon signal may be transmitted from or near each charging port. The receiver device determines which beacon transmitter (e.g., which charging port) is closest to the receiving device like as described with respect to determining which EVSE is closest to the receiving device.

Figure 6:
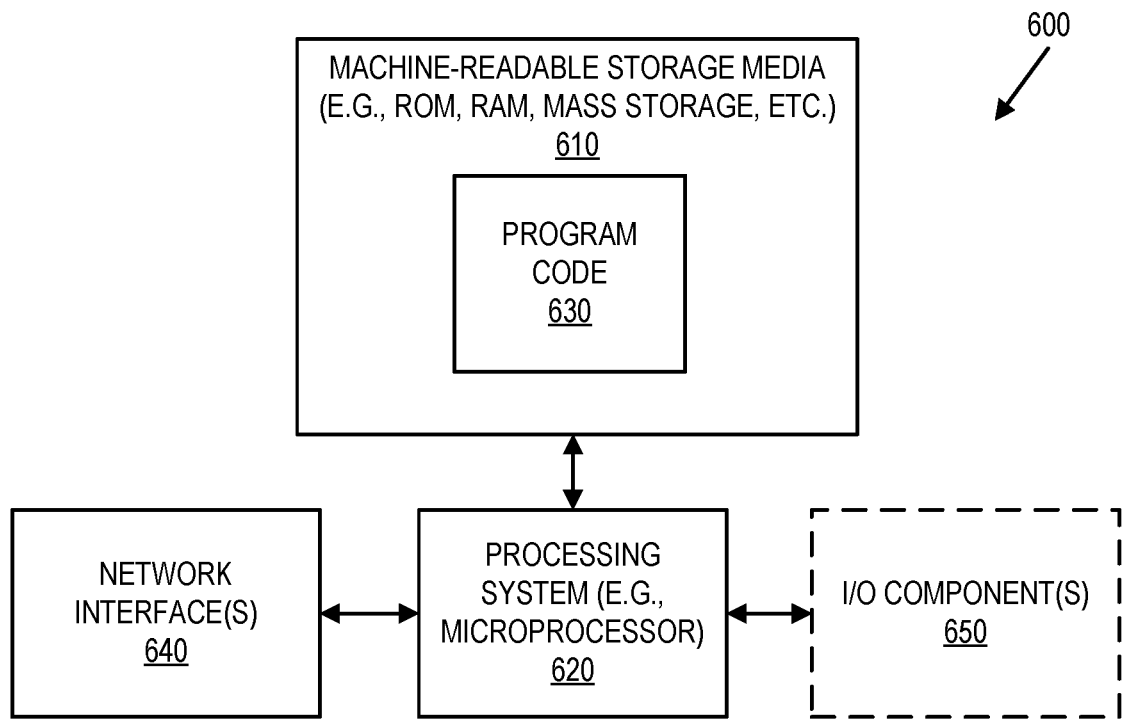
FIG. 6 is a block diagram illustrating a data processing system that can be used in an embodiment.

FIG. 6 illustrates a block diagram for an exemplary data processing system 600 that may be used in some embodiments. One or more such data processing systems 600 may be used to implement the embodiments and operations described with respect to the receiver device or server. Data processing system 600 includes a processing system 620 (e.g., one or more processors and connected system components such as multiple connected chips).

The data processing system 600 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 610 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 620. For example, the depicted machine-readable storage media 610 may store program code 630 that, when executed by the processor(s) 620, causes the data processing system 600 to execute operations described herein.

The data processing system 600 also includes one or more network interfaces 640 (e.g., a wired and/or wireless interfaces) that allows the data processing system 600 to transmit data and receive data from other computing devices, typically across one or more networks (e.g., Local Area Networks (LANs), the internet, etc.). The data processing system 600 may also include one or more input or output ("I/O") components 650 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 600, and, in certain embodiments, fewer components than that shown in One or more buses may be used to interconnect the various components shown in FIG. 6.

Figure 7:
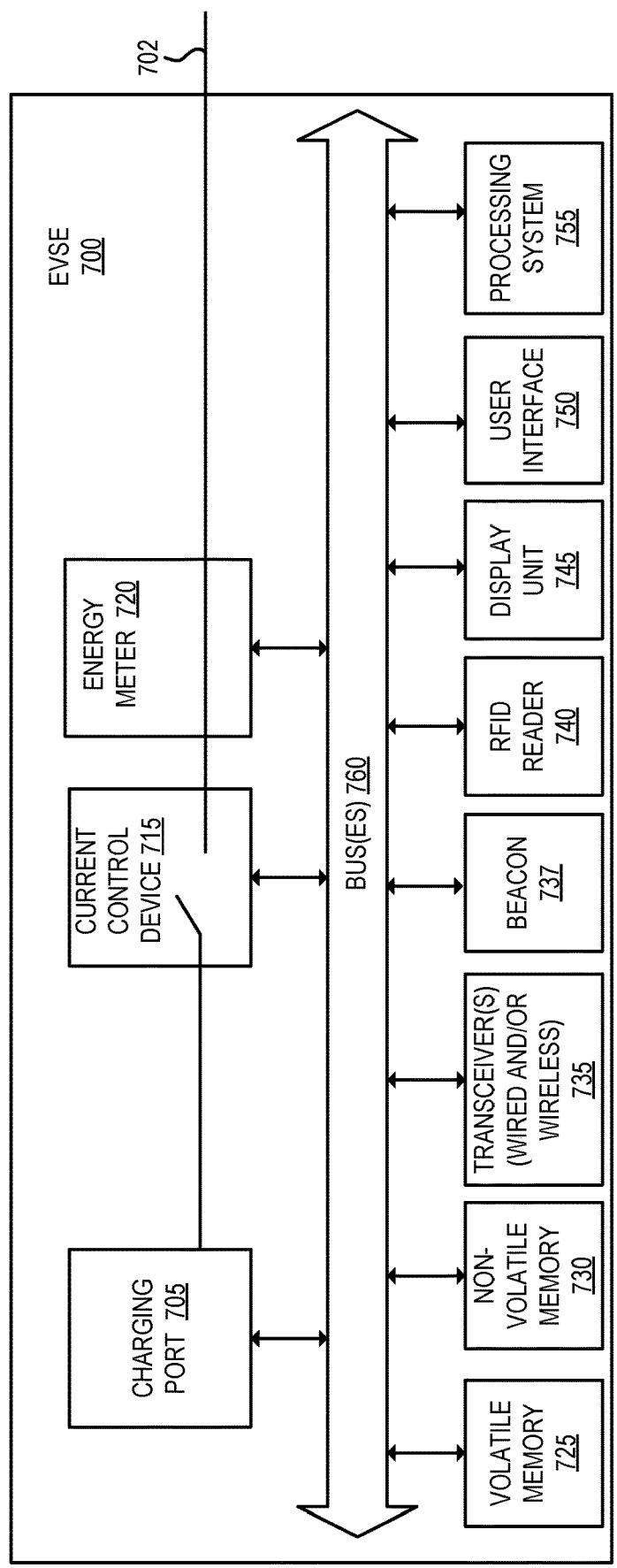
FIG. 7 shows an exemplary embodiment of an EVSE according to an embodiment.

FIG. 7 shows an exemplary embodiment of an EVSE according to an embodiment. Although several components are illustrated as being included in the EVSE 700, in some embodiments additional, different, or less components may be used in the EVSE 700. For example, some EVSE may not include a display or a user interface. Other EVSE may not include an RFID reader or an energy meter. Other EVSE may include one or more lights that can provide visual indications.

As illustrated in FIG. 7, the EVSE 700 includes the charging port 705, the current control device 715, the energy meter 720, the volatile memory 725, the non-volatile memory 730 (e.g., hard drive, flash, PCM, etc.), one or more transceiver(s) 735 (e.g., wired transceiver(s) (e.g., Ethernet, power line communication (PLC), etc.) and/or wireless transceiver(s) (e.g., 802.15.4 (e.g., ZigBee, etc.), Bluetooth, Wi-Fi, Infrared, GPRS/GSM, CDMA, etc.)), the beacon 737, the RFID reader 740, the display unit 745, the user interface 750, and the processing system 755 (e.g., one or more microprocessors and/or a system on an integrated circuit), which may be coupled with one or more buses 760.

The charging port 705 is a power receptacle, circuitry for an attached charging cord (e.g., with a SAE J1772 connector), or circuitry for inductive charging. While FIG. 7 illustrates a single charging port 705, the EVSE 700 may include multiple charging ports and which may be the same or different types.

The current control device 715 controls the current flowing on the power line 702. For example, in some embodiments the current control device 715 energizes the charging port 705 (e.g., by completing the circuit to the power line 702) or de-energizes the charging port 705 (e.g., by breaking the circuit to the power line 702). The current control device 715 may be a set of contactors. In some embodiments the current control device 715 energizes the charging port 705 responsive to receiving a command from a server that indicates charging is authorized through the charging port.

The energy meter 720 measures the amount of electricity that is flowing on the power line 702 through the charging port 705. While in one embodiment the energy meter 720 measures current flow, in an alternative embodiment the energy meter 720 measures power draw. The energy meter 720 may be an induction coil or other devices suitable for measuring electricity. In some embodiments, the energy meter 720 is a programmable time of use energy meter (e.g., programmed according to the prices and time periods defined by the owner or operator of the EVSE). While the energy meter 720 is illustrated as being included within the EVSE 700, in other embodiments the energy meter 720 is exterior to the EVSE 700 but capable of measuring the amount of electricity flowing on the power line 702 through the charging port 705.

The RFID reader 740 reads RFID tags from RFID enabled devices (e.g., smartcards, key fobs, contactless credit cards, etc.), embedded with RFID tag(s) of operators that want to use the charging port 705 of the EVSE 700. For example, in some embodiments a vehicle operator can wave/swipe an RFID enabled device near the RFID reader 740 to provide an access credential for use of the charging port 705. Electric vehicle operators may use the RFID reader 740 for payment. In addition to an RFID reader, the EVSE 700 may also include a credit card reader.

The transceiver(s) 735 transmit and receive messages. For example, the transceiver(s) 735 may transmit authorization requests to the EV charging network server, receive commands from the EV charging network server indicating whether the charging session is authorized, etc. The beacon 737 (which may be part of a Bluetooth transceiver) periodically broadcasts beacon signals as described herein.

The display unit 745 is used to display messages to vehicle operators including charging status, confirmation messages, error messages, notification messages, etc. The display unit 745 may also display parking information if the EVSE 700 is also acting as a parking meter (e.g., amount of time remaining in minutes, parking violation, etc.).

The user interface 750 allows operators to interact with the EVSE 700. By way of example, the user interface 750 allows electric vehicle operators to present an access credential, enter in account and/or payment information, etc.

The processing system 755 may retrieve instruction(s) from the volatile memory 725 and/or the nonvolatile memory 730 and execute the instructions to perform operations for the electric vehicle charging station.

The techniques shown in the figures can be implemented using code and data stored and executed on one or more electronic devices (e.g., a receiver device, an EVSE, a server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details are set forth in order to provide a more thorough understanding of the present invention. It will be appreciated, however, by one skilled in the art that embodiments can be practiced without such specific details. In other instances, control structures, gate level circuits and full software instruction sequences have not been shown in detail in order not to obscure understanding of the embodiments. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative rather than limiting.

What is claimed is:

1. A method for automatically identifying an electric vehicle supply equipment (EVSE), comprising:
   receiving, at a receiver device, a plurality of wireless signals from a plurality of EVSEs respectively, wherein each of the plurality of wireless signals includes an identifier that is associated with the one of the plurality of EVSEs from which that wireless signal is received;
   recording signal strength values of the plurality of wireless signals;
   determining, based on the recorded signal strength values of the plurality of wireless signals, which of the plurality of EVSEs is closest to the receiver device; and
   initiating a request for an action at the EVSE determined to be closest to the receiver device.

2. The method of claim 1, wherein the received plurality of wireless signals are Bluetooth Low Energy (BLE) beacon signals.

3. The method of claim 1, wherein the receiver device is included within an electric vehicle, and wherein determining which of the plurality of EVSEs is closest to the receiver device is performed by an application executing within the electric vehicle.

4. The method of claim 3, wherein determining, based on the recorded signal strength values of the plurality of wireless signals, which of the plurality of EVSEs is closest to the receiver device is performed responsive to detecting that a door of the electric vehicle has been opened or the electric vehicle has been put into park.

5. The method of claim 1, wherein the receiver device is a smartphone, and wherein determining which of the plurality of EVSEs is closest to the receiver device is performed by an application executing within the smartphone.

6. The method of claim 5, wherein determining, based on the recorded signal strength values of the plurality of wireless signals, which of the plurality of EVSEs is closest to the receiver device is performed responsive to detecting that the smartphone has transitioned from driving mode to non-driving mode.

7. The method of claim 1, wherein initiating the request for the action at the determined EVSE includes transmitting an EVSE identifier that is associated with the EVSE that is determined to be closest to the receiver device to a server to perform an authorization procedure.

8. The method of claim 7, wherein initiating the request for an action at the determined EVSE includes transmitting an identifier associated with an operator of an electric vehicle or an identifier associated with the electric vehicle to the server.

9. A method, comprising:
   broadcasting, from a plurality of electric vehicle supply equipments (EVSEs), a plurality of wireless signals, wherein each wireless signal from one of the plurality of EVSEs includes an identifier that is uniquely associated with that one of the plurality of EVSEs, the plurality of wireless signals being capable of being used by an application of a receiver device as a basis to automatically identify which of the plurality of EVSEs is closest to the receiver device;
   receiving, at one of the plurality of EVSEs, a communication from a server that indicates to enable charging;
   unlocking a charging port at that one of the plurality of EVSEs responsive to the received communication; and
   enabling charging service through the unlocked charging port.

10. The method of claim 9, wherein the wireless signals are each a Bluetooth Low Energy (BLE) beacon signal.

11. The method of claim 9, further comprising:
    showing a visual indicator on the one of the plurality of EVSEs that signifies that the one of the plurality of EVSEs has been automatically identified.

12. The method of claim 9, wherein prior to broadcasting the wireless signals, each of the plurality of EVSEs determining that it is available for charging an electric vehicle.

13. The method of claim 12, wherein determining that the EVSE is available for charging an electric vehicle includes determining that the EVSE is not currently charging an electric vehicle.

14. A non-transitory machine-readable storage medium that provides instructions that, if executed by a processor, will cause said processor to perform operations for automatically identifying an electric vehicle supply equipment (EVSE) comprising:
    receiving, at a receiver device, a plurality of wireless signals from a plurality of EVSEs respectively, wherein each of the plurality of wireless signals includes an identifier that is associated with the one of the plurality of EVSEs from which that wireless signal is received;
    recording signal strength values of the plurality of wireless signals;
    determining, based on the recorded signal strength values of the plurality of wireless signals, which of the plurality of EVSEs is closest to the receiver device; and
    initiating a request for an action at the EVSE determined to be closest to the receiver device.

15. The non-transitory machine-readable storage medium of claim 14, wherein the received plurality of wireless signals are Bluetooth Low Energy (BLE) beacon signals.

16. The non-transitory machine-readable storage medium of claim 14, wherein the receiver device is included within an electric vehicle, and wherein determining which of the plurality of EVSEs is closest to the receiver device is performed by an application executing within the electric vehicle.

17. The non-transitory machine-readable storage medium of claim 16, wherein determining, based on the recorded signal strength values of the plurality of wireless signals, which of the plurality of EVSEs is closest to the receiver device is performed responsive to detecting that a door of the electric vehicle has been opened or the electric vehicle has been put into park.

18. The non-transitory machine-readable storage medium of claim 14, wherein the receiver device is a smartphone, and wherein determining which of the plurality of EVSEs is closest to the receiver device is performed by an application executing within the smartphone.

19. The non-transitory machine-readable storage medium of claim 18, wherein determining, based on the recorded signal strength values of the plurality of wireless signals, which of the plurality of EVSEs is closest to the receiver device is performed responsive to detecting that the smartphone has transitioned from driving mode to non-driving mode.

20. The non-transitory machine-readable storage medium of claim 14, wherein initiating the request for the action at the determined EVSE includes transmitting an EVSE identifier that is associated with the EVSE that is determined to be closest to the receiver device to a server to perform an authorization procedure.

\* \* \* \* \*